United States Patent
Park et al.

(10) Patent No.: US 6,899,364 B2
(45) Date of Patent: May 31, 2005

(54) STOPPER STRUCTURE IN A GLOVE BOX

(75) Inventors: In-heum Park, Suwon-shi (KR);
Ta-hyun Kim, Ulsan Metropolitan (KR)

(73) Assignee: Hyundai MOBIS Co., Ltd., Seoul (KR)

( * ) Notice: Subject to any disclaimer, the term of this patent is extended or adjusted under 35 U.S.C. 154(b) by 0 days.

(21) Appl. No.: 10/720,235

(22) Filed: Nov. 25, 2003

(65) Prior Publication Data

US 2005/0082864 A1 Apr. 21, 2005

(30) Foreign Application Priority Data

Oct. 17, 2003 (KR) .................... 10-2003-0072656

(51) Int. Cl.$^7$ .............................................. B60R 7/06
(52) U.S. Cl. .............................. 296/37.12; 312/334.46
(58) Field of Search ............................ 296/37.1, 37.8, 296/37.12, 70, 1.07; 312/334.44, 334.46, 312/334.47

(56) References Cited

U.S. PATENT DOCUMENTS

| 4,743,060 | A | * | 5/1988 | Hishida | .................... 296/37.12 |
| 5,385,378 | A | | 1/1995 | Hakamada et al. | |
| 5,845,954 | A | * | 12/1998 | DePue | ..................... 296/37.12 |
| 5,868,448 | A | * | 2/1999 | Izumo | ....................... 296/37.1 |
| 6,076,878 | A | * | 6/2000 | Isano | ....................... 296/37.12 |
| 6,152,512 | A | * | 11/2000 | Brown et al. | ............. 296/37.12 |
| 6,213,533 | B1 | * | 4/2001 | Widulle et al. | .......... 296/37.12 |
| 6,629,716 | B2 | * | 10/2003 | Shibata et al. | ................. 296/70 |
| 6,749,242 | B2 | * | 6/2004 | Park | ........................ 296/37.12 |

FOREIGN PATENT DOCUMENTS

JP 57-175474 10/1982

OTHER PUBLICATIONS

English Langauge Abstract of JP 57-175474.

* cited by examiner

Primary Examiner—Patricia L. Engle
(74) Attorney, Agent, or Firm—Greenblum & Bernstein, P.L.C.

(57) ABSTRACT

A stopper structure in a glove box permits removal of the glove box from a glove box housing by a simple operation. The stopper structure in a glove box includes a box housing which is installed at a certain position of an instrument panel and at which a longitudinal direction of guide groove is formed at its upper surface; a glove box hinged to a lower part of the box housing to rotate at a certain angle to be opened/closed; a stopper formed at an upper edge of an inside of the glove box to be inserted into the guide groove to be moved along the guide groove to limit an open/close displacement of the glove box; and a resiliently movable member interposed between the glove box and the stopper to resiliently separate the stopper from the guide groove by an external force.

8 Claims, 5 Drawing Sheets

STOPPER STRUCTURE IN A GLOVE BOX

RELATED APPLICATION

The present disclosure relates to subject matter contained in Korean application No. 2003-72656, filed on Oct. 17, 2003, which is herein expressly incorporated by reference its entirety.

BACKGROUND OF THE INVENTION

1. Field of the Invention

The present invention relates to a stopper structure in a glove box, and more particularly, to a stopper structure in a glove box capable of removing the glove box from a glove box housing by a simple operation.

2. Description of the Related Art

A glove box is installed at an instrument panel in front of a passenger's seat, and the glove box is constructed to be opened/closed by a pull/push operation of a user to store necessary items.

The glove box is hinged on an inner side of a box housing to be rotated to and fro, and a stopper is installed between both sides and the box housing to guide the opening/closing of the glove box.

That is, the stopper protruding to a side surface of the glove box is inserted into an arc shaped guide groove of the box housing to move in the guide groove when the glove box is opened/closed, thereby stably opening/closing the glove box.

However, the stopper of the glove box has a problem in that assemby is complicated because it has to be assembled at both sides, requires a lot of assembly time due to the large number of parts, and has a poor appearance due to an outward protrusion of the glove box.

Therefore, as shown in FIGS. 1 and 2, Japanese Laid-Open Publication Patent No. 1982-175474 proposes a stopper hook 8 integrally formed at a rear side of a box housing 5.

That is, formed at an instrument panel 1 is an attached depression part 2, with which the box housing 5 is engaged.

Further, a glove box 3 is inserted into the box housing 5, and a bottom surface of the glove box 3 is engaged with a hinge 4.

In addition, the rear plate of the box housing 5 has a stopper hook 8 integrally protruding and provided with a hook 7 to fix the glove box to the stopper hook 8 when the glove box is opened.

However, the prior art stopper hook has a problem of causing complications during removal since the hook cannot be easily taken off the glove box when the glove box is removed from the box housing because the stopper is integrally fixed to the rear side of the box housing to prevent the hook from rotating.

SUMMARY OF THE INVENTION

To solve the above-mentioned problems, an object of the present invention is to provide a stopper structure in a glove box provided with a stopper movable at an upper edge of an inside of a glove box to easily fix the glove box to and be removed from the box housing.

To accomplish the above-mentioned objects, the present invention provides a stopper structure in a glove box capable of improving assembly efficiency and reducing the number of parts by simply installing and removing the stopper resiliently movable at an upper edge of an inside of the glove box.

BRIEF DESCRIPTION OF DRAWINGS

These and other features, aspects, and advantages of preferred embodiments of the present invention will be more fully described in the following detailed description, taken accompanying drawings. In the drawings.

DESCRIPTION OF THE PREFERRED EMBODIMENT

Hereinafter, the present invention will be apparent from the detailed description in conjunction with the accompanying drawings.

Figure 1:
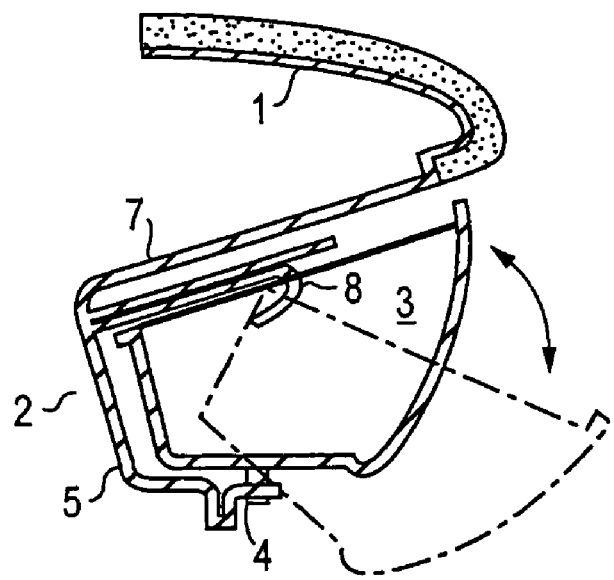
FIG. 1 is a cross-sectional view of a prior art glove box.
Figure 2:
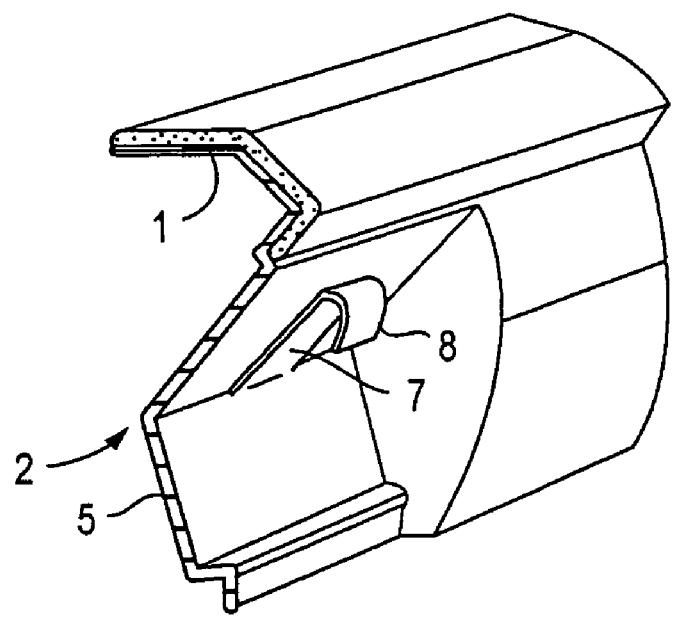
FIG. 2 is a perspective view for illustrating a hook of a prior art glove box.
Figure 3:
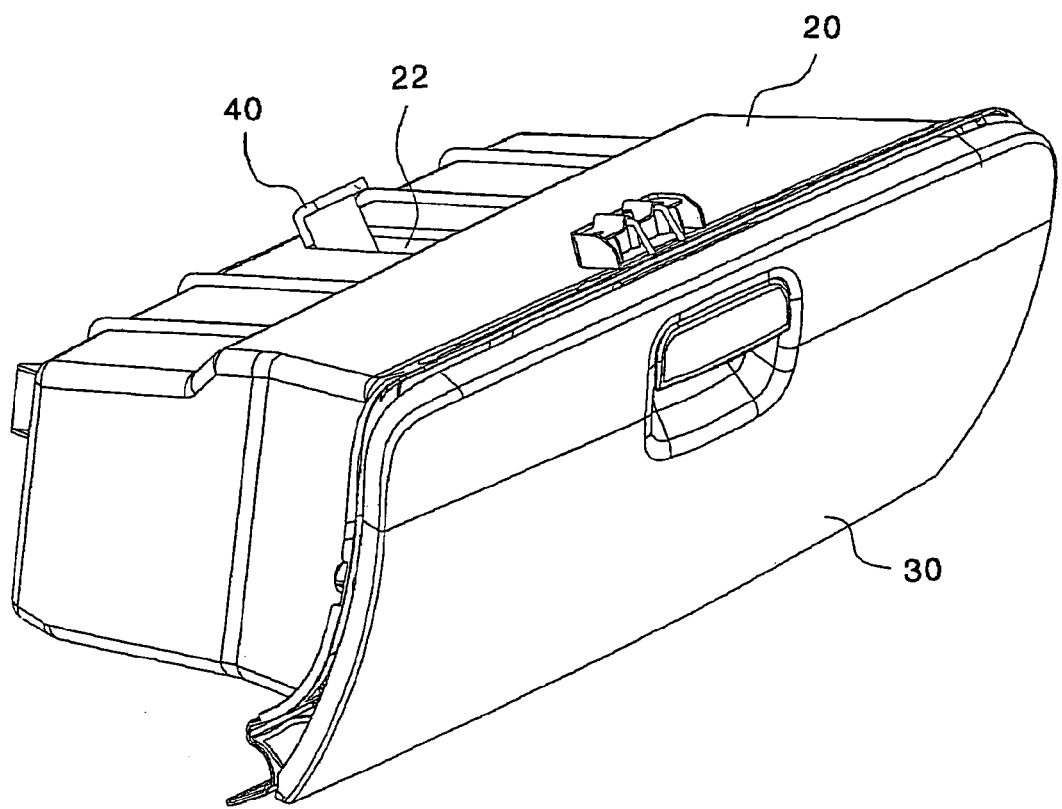
FIG. 3 is a perspective view of a glove box in accordance with the present invention.
Figure 4:
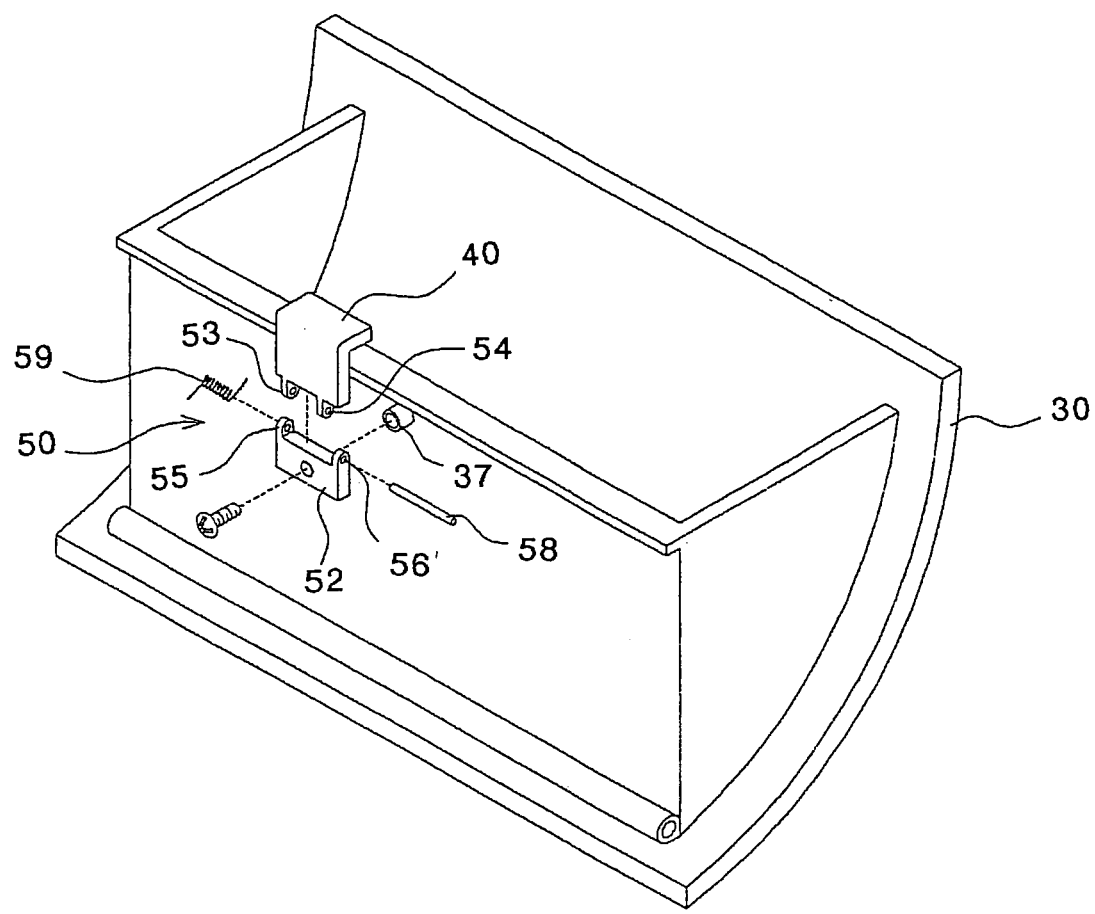
FIG. 4 is an exploded perspective view of a stopper in a glove box in accordance with the present invention.
Figure 5A:
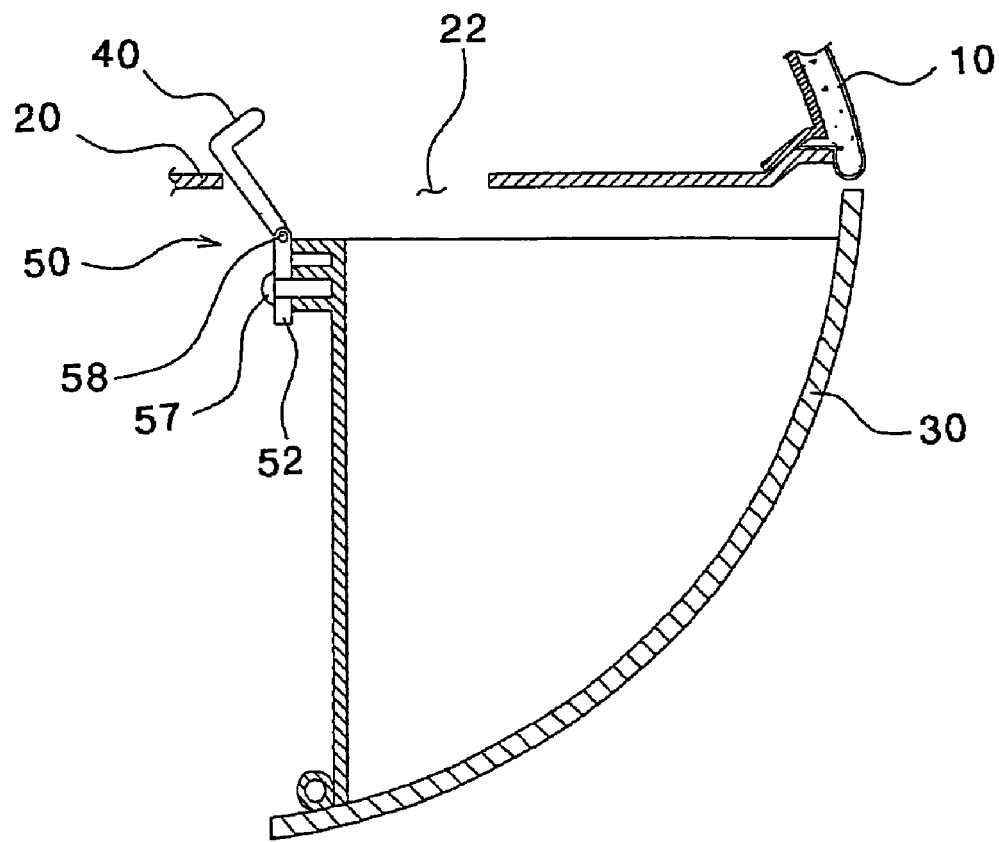
FIGS. 5a and 5b are views for illustrating an operating state of a stopper in a glove box in accordance with the present invention.
Figure 5B:
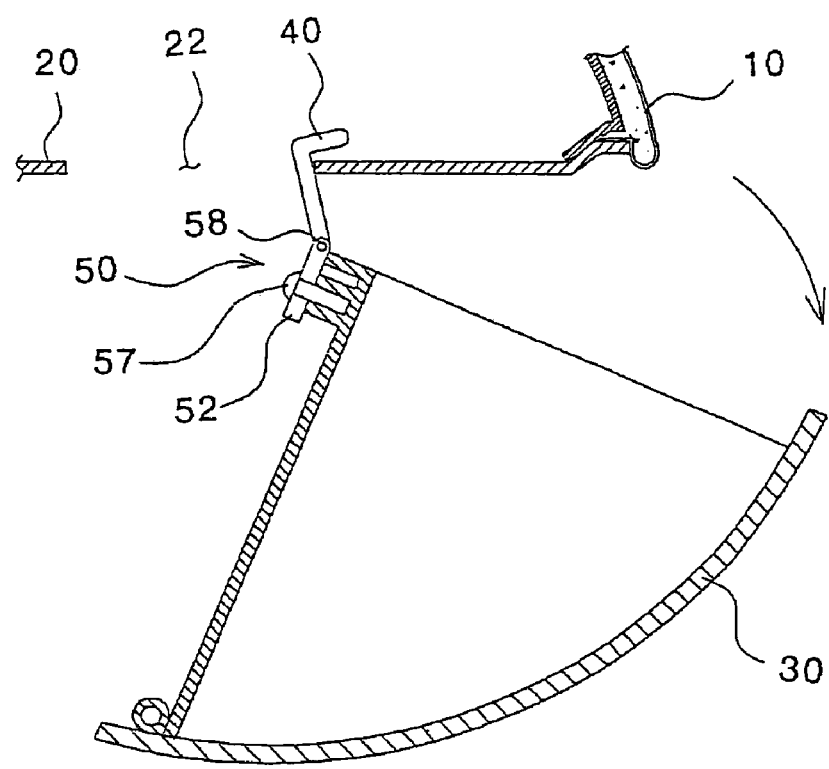

FIG. 3 is a perspective view of a glove box in accordance with the present invention; FIG. 4 is an exploded perspective view of a stopper in a glove box in accordance with the present invention; and FIGS. 5a and 5b are views for illustrating an operating state of a stopper in a glove box in accordance with the present invention.

As shown in FIGS. 3 to 5b, the stopper structure in a glove box in accordance with the present invention, which is installed at a certain position of an instrument panel 10, comprises: a box housing 20 at which a longitudinal guide groove 22 is formed at its upper surface; a glove box 30 hinged to a lower part of the box housing 20 to rotate at a certain angle to be opened/closed; a stopper 40 formed at an upper edge of the inside of the glove box 30 and inserted into the guide groove 22 to be moved along the guide groove to limit the open/close displacement of the glove box 30; and a resiliently movable member 50 interposed between the glove box 30 and the stopper 40 to resiliently separate the stopper 40 from the guide groove 22 by an external force.

As shown in FIGS. 3 and 4, the glove box 30 is hinged to the box housing 20 to be opened/closed.

The box housing 20 is engaged with and installed at the instrument panel 10 to be described hereinafter.

Further, the guide groove 22 is formed to a certain length in a longitudinal direction at an upper surface of the box housing 20.

The guide groove 22 is formed to a length corresponding to a moving displacement of an inner side surface when the glove box 30 is opened/closed.

In addition, the glove box 30 has a hollow shape of which an upper part is opened.

Further, the stopper 40 is formed at an upper edge of an inside of the glove box 30.

The stopper 40 is installed to correspond to the guide groove 22 of the box housing 20.

Therefore, the stopper 40 is inserted into the guide groove 22 to be guided to limit the displacement.

The stopper 40 is formed to be bent in the proceeding direction upon opening of the glove box 30 to be stopped at a front side of the guide groove 22.

As the glove box 30 is opened/closed, the stopper 40 contacts with both edges of the guide groove 22 of the box housing 20 to limit open/close displacement.

Especially, since the glove box 30 is rotated at a certain angle with respect to the box housing 20 to make an inner side surface of the glove box 30 also form an arc track, preferably, the upper end of the stopper 40 is bent inward to be stopped by the guide groove 22.

On the other hand, the stopper 40 is resiliently installed by the movable member 50.

That is, to easily remove the glove box 30 from the box housing 20 upon opening the glove box 30, the resiliently movable member 50 is formed to separate the stopper 40 stopped at the front edge of the guide groove 22 from the guide groove 22.

The resiliently movable member 50 comprises a stopper holder 52 engaged with the upper edge of the inside of the glove box 30, a hinge pin 58 for hingeably connecting the stopper holder 52 and the stopper 40, and a spring 59 wound to an edge of the hinge pin 58 to resiliently move the stopper 40 with respect to the stopper holder 52.

The stopper holder 52 is fixed to an outer side surface of an inner part of the glove box 30 by a screw 57.

A fastening hole 37 is formed at a rear edge of the glove box 30, and the stopper holder 52 and the glove box 30 are engaged by the screw 57.

Further, the stopper 40 is hinged to the stopper holder 52.

That is, formed at a lower part of the stopper 40 is a pair of first hinge protrusions 53 spaced from each other at a constant interval.

And, the first hinge protrusions 53 are provided with first hinge holes 54 to face each other.

Further, second hinge protrusions 55 contacted with the outsides of first hinge protrusions 53 protrude at the upper end of the stopper holder 52.

And, the second hinge protrusions 55 are provided with second hinge holes 56 to face each other.

That is, the first hinge holes 54 and the second hinge holes 56 are in communication with each other.

Further, the stopper 40 and the stopper holder 52 are connected by the hinge pin 58.

That is, a cylindrical bar shaped hinge pin 58 is inserted into the first hinge holes 54 and the second hinge holes 56.

At this time, in order to resiliently move the stopper with respect to the stopper holder 52, the hinge pin 58 inserted into each one of the first hinge holes 54 and the first hinge holes 56 is inserted into the first hinge holes 54 and second hinge holes 56 remained after the insertion of the spring 59.

The spring 59 is installed to be supported by the front side of the stopper 40 at its one end, and supported by a rear side of the stopper holder 52 at the other end.

At this time, the spring 59 is adjusted so that the stopper 40 and the stopper holder 52 maintain to form a straight line when an external force is not applied.

Hereinafter, an operation of the constructed stopper structure in a glove box in accordance with the present invention will be described as follows.

As shown in FIG. 5a, the box housing 20 is engaged with a certain position of the instrument panel 10.

And, the glove box 30 opened/closed to an inner/outer part of the box housing 20 is hinged to the box housing 20.

Further, the guide groove 22 is formed at the upper surface of the box housing 20, and the stopper 40 is formed at the upper edge of the inside of the glove box 30 to be inserted into the guide groove 22.

As the glove box 30 is opened, the stopper 40 is guided along the guide groove 22.

In addition, the stopper 40 of the glove box 30 is installed by the resiliently movable member 50.

When the glove box 30 is opened to a certain open/close displacement set by the guide groove 22, the stopper 40 is stopped at the edge of the guide groove 22.

At this time, since the upper end of the stopper 40 is bent inward of the glove box 30, though the stopper 40 is rotated backward at a predetermined angle by the resiliently movable member 50, the stopper 40 is stopped by the edge of the guide groove 22.

As shown in FIG. 5b, when the glove box 30 is opened and the stopper 40 is stopped by the edge of the guide groove 22, a user applies an external force to push the stopper 40 backward to remove the glove box 30.

When the stopper 40 receives the external force, the stopper 40 is rotated backward at a certain angle by the resiliently movable member 50.

That is, the stopper 40 is rotated backward with respect to the stopper holder 52 to be separated from the guide groove 22.

At this time, the stopper 40 receives a force of rotating forward by the spring 59.

An operator separates the stopper 40 from the guide groove 22 to remove the glove box 30 from the box housing 20.

On the other hand, the operator pulls back the stopper 40 and then the glove box 30 is inserted into the inner part of the box housing 20 so that the glove box 30 can be installed into the box housing 20.

Further, when the stopper 40 of the glove box 30 is inserted into the guide groove 22 of the box housing 20, the stopper 40 and the stopper holder 52 aligns in a straight line by a resilient force of the spring 59.

Non-described reference numerals are substituted by the above-mentioned description.

As described hereinabove, the stopper structure in the glove box in accordance with the present invention has the effect of reducing the time for assembly and disassembly operations since the glove box is provided with the stopper at its inner upper edge to easily remove the glove box at once.

Further, only one stopper is formed at the center part of the glove box not on both sides thereof, thereby reducing the number of parts and improving appearance.

In addition, since the stopper is rotated at a certain angle by the resiliently movable member, the glove box can be easily assembled or removed from the box housing.

While this invention has been described in connection with what is presently considered to be the most practical and preferred embodiment, it is to be understood that the invention is not limited to the disclosed embodiment, but is intended to cover various modification within the spirit and scope of the appended claims.

What is claimed is:

1. A stopper structure in a glove box, comprising:
   a box housing, which is installed to an instrument panel, and having a longitudinal guide groove formed at an upper surface of the box housing;
   a glove box hinged to a lower part of the box housing to rotate between an open and closed position;
   a stopper formed at an upper edge of an inside of the glove box and extending into the guide groove to be moved along the guide groove to limit open/close displacement of the glove box; and
   a resiliently movable member interposed between the glove box and the stopper to resiliently separate the stopper from the guide groove by an external force.

2. The stopper structure in a glove box according to claim 1, wherein the resiliently movable member comprises:
- a stopper holder engaged with the upper edge of the inside of the glove box;
- a hinge pin for hingeably connecting the stopper holder and the stopper; and
- a spring wound about a peripheral edge of the hinge pin to resiliently move the stopper with respect to the stopper holder.

3. A glove box assembly, comprising:
- a box housing attached to an instrument panel and including a longitudinal groove guide in a first surface of the box housing, the longitudinal groove guide including an opening through the first surface of the box housing extending from a first edge near a rear portion of the box housing to a second edge near a front portion of the box housing;
- a glove box hinged to a lower part of the box housing, the glove box configured to be rotatable between an open position and a closed position;
- a stopper at an upper edge of a rear exterior surface of the glove box, the stopper extending through the guide groove and movable along the guide groove, the stopper limiting displacement of the glove box when the stopper contacts the second edge of the box housing; and
- a resiliently movable member between the glove box and the stopper, resiliently separating the stopper from the guide groove when an external force is applied to the stopper.

4. The glove box assembly according to claim 3, wherein the stopper contacts the first edge of the box housing when the glove box is closed.

5. The glove box assembly according to claim 3, wherein the glove box is removable from the box housing when the stopper is separated from the groove guide by the external force.

6. A glove box assembly, comprising:
- a box housing attached to an instrument panel and including a single longitudinal groove guide formed substantially in a center of a first surface of the box housing, the longitudinal groove guide including an opening through the first surface of the box housing extending from a first edge near a rear portion of the box housing to a second edge near a front portion of the box housing;
- a glove box hinged to a lower part of the box housing, the glove box configured to be rotatable between an open position and a closed position;
- a single stopper at an upper edge of a rear exterior surface of the glove box, the stopper extending through the guide groove and movable along the guide groove, the stopper limiting displacement of the glove box when the stopper contacts the second edge of the box housing; and
- a resiliently movable member between the glove box and the stopper, resiliently separating the stopper from the guide groove when an external force is applied to the stopper.

7. The glove box assembly according to claim 6, wherein the stopper extends through the groove guide when the external force is not applied.

8. The glove box assembly according to claim 6, wherein the stopper includes a bent portion having an angle of substantially 90 degrees.

\* \* \* \* \*